(12) United States Patent
Pasquet (10) Patent No.: US 9,523,350 B2
(45) Date of Patent: Dec. 20, 2016

(54) WIND TURBINE AUXILIARY DRIVE SYSTEM

(75) Inventor: Pierre Pasquet, Wassenaar (NL)

(73) Assignee: ALSTOM Renovables España, S.L., Barcelona (ES)

( * ) Notice: Subject to any disclaimer, the term of this patent is extended or adjusted under 35 U.S.C. 154(b) by 476 days.

(21) Appl. No.: 14/131,196

(22) PCT Filed: Jul. 12, 2012

(86) PCT No.: PCT/EP2012/063655
§ 371 (c)(1),
(2), (4) Date: Apr. 10, 2014

(87) PCT Pub. No.: WO2013/007777
PCT Pub. Date: Jan. 17, 2013

(65) Prior Publication Data
US 2014/0205456 A1    Jul. 24, 2014

Related U.S. Application Data

(60) Provisional application No. 61/534,021, filed on Sep. 13, 2011.

(30) Foreign Application Priority Data

Jul. 13, 2011  (EP) ..................................... 11382236

(51) Int. Cl.
*B63H 3/00*   (2006.01)
*F03D 7/02*   (2006.01)
*F03D 7/04*   (2006.01)

(52) U.S. Cl.
CPC .............. *F03D 7/0224* (2013.01); *F03D 7/04* (2013.01); *F03D 80/70* (2016.05); *F05B 2260/79* (2013.01); *F05B 2260/98* (2013.01); *Y02E 10/722* (2013.01)

(58) Field of Classification Search
CPC .......... F03D 7/0224; F03D 7/04; F03D 80/70; F05B 2260/79; F05B 2260/98; Y02E 10/722; Y02E 10/72
(Continued)

(56) References Cited

U.S. PATENT DOCUMENTS 3,811,577 A  *  5/1974  Yancey ................ B62D 55/062
                                                    212/247
7,077,630 B2    7/2006  Wobben
(Continued)

FOREIGN PATENT DOCUMENTS

DE      102006050765 B3    12/2007
DE      102008045939         3/2010
(Continued)

OTHER PUBLICATIONS

International Search Report for PCT/EP2012/063655, mailed Nov. 2, 2012, 12 pgs.

*Primary Examiner* — Jessica Cahill
(74) *Attorney, Agent, or Firm* — Dority & Manning, P.A.

(57) ABSTRACT

Wind turbine auxiliary drive system comprising a motor, a drive pinion, a bearing and a lubrication system, the bearing comprising an outer bearing ring, an inner bearing ring and, between these two bearing rings, one or more rows of rolling elements which allow both bearing rings to rotate relative to each other, the inner bearing ring having an inner side comprising a gear which meshes with the drive pinion, wherein a height of the gear in an axial direction is smaller than the height of the inner bearing ring such that a gearless portion is defined, and wherein at least one lubricant inlet and/or at least one lubricant outlet is arranged on said gearless portion.

12 Claims, 6 Drawing Sheets

(58) Field of Classification Search
USPC .................................................. 416/155, 174
See application file for complete search history.

(56) References Cited

U.S. PATENT DOCUMENTS

| | | | |
|---|---|---|---|
| 7,470,111 B2 | 12/2008 | Schubert | |
| 2008/0099280 A1* | 5/2008 | Kroh | F16C 33/664 |
| | | | 184/4 |
| 2009/0058094 A1* | 3/2009 | Jansen | F16H 1/28 |
| | | | 290/55 |
| 2010/0135808 A1 | 6/2010 | Wierbock | |
| 2011/0222804 A1* | 9/2011 | Okano | F16C 19/38 |
| | | | 384/471 |
| 2011/0235953 A1* | 9/2011 | Wheals | F16C 19/38 |
| | | | 384/100 |
| 2011/0278851 A1* | 11/2011 | Fujioka | F16J 15/002 |
| | | | 290/55 |
| 2011/0286844 A1* | 11/2011 | Takayanagi | F16N 39/04 |
| | | | 416/95 |

FOREIGN PATENT DOCUMENTS

| | | |
|---|---|---|
| WO | WO 03/019004 | 3/2003 |
| WO | WO 2010/125000 | 11/2010 |

* cited by examiner

WIND TURBINE AUXILIARY DRIVE SYSTEM

This application claims the benefit of European Patent Application EP 11382236.5 filed on Jul. 13, 2011 and U.S. Provisional Patent Application Ser. No. 61/534,021 filed on Sep. 13, 2011.

The present invention relates to a wind turbine auxiliary drive system comprising a slew bearing and a lubrication system. The invention further relates to a wind turbine comprising the same.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox.

An important auxiliary system generally provided on wind turbines is the pitch system.

Pitch systems are employed for adapting the position of a wind turbine blade to varying wind conditions. In this respect, it is known to rotate the position of a blade along its longitudinal axis with respect to the rotor hub aided by a slew bearing.

This slew bearing normally comprises an outer ring, an inner ring and, between these two rings, one or more rows of rolling elements which allow both rings to rotate relative to each other. In some cases this type of bearing may comprise a gear which meshes with a drive pinion.

These bearings normally include an annular chamber for retaining the rolling elements. The bearing chamber is normally built from two annular components known as raceways, more particularly outer and inner raceways having interior surfaces which form the radial walls of the bearing chamber. A lubrication fluid, such as oil or grease, is normally contained within the bearing chamber in order to reduce the friction between the components and also to assist in the dissipation of heat. A circulation system may further be provided to inject and/or drain lubrication fluid into the bearing chamber.

The loss of lubricating effectiveness may result in accelerated wear of the bearing elements.

Thus, proper lubrication of the bearings must be provided and maintained, in particular lubrication of the contact areas between raceways and rolling elements arranged inside the bearing chamber. Such lubrication may be particularly complicated and expensive due to the complicated accessibility of such contact areas.

Document U.S. Pat. No. 7,077,630 describes the lubrication of a pitch system of a windmill wherein the spacing between the rolling bodies of the bearing and the teeth of the gear is very small and the bearing arrangement and the teeth are disposed in the volume region of a lubricant chamber. The lubricant chamber has the form of a circular ring which is coaxial with the bearing and the gear and which has two radially outer wall regions separated from each other by a gap which permits the rotary movement of the two wall regions with the rotor blade and the hub respectively. Such an arrangement is rather complicated and adds the extra weight of the lubricant chamber to the system.

Document U.S. Pat. No. 7,470,111 describes a wind turbine wherein a blade bearing includes an inner ring that is firmly fixed to the rotor hub and an outer ring that is fitted with a toothing and is firmly connected to the rotor blade. A lubrication pinion is situated next to the drive pinion and underneath a cover means. Such cover means protects the lubrication pinion (and the drive pinion) against corrosion and contaminants. This is an expensive solution and the complete sealing of the cover may be difficult to achieve. If the sealing is not complete, the cover may not give an adequate protection against extreme temperatures and humidity.

Thus, there still exists a need to provide a cost-effective lubrication system for lubrication of the contact areas between raceways and internal rolling elements arranged inside the bearing chamber.

SUMMARY OF THE INVENTION

In a first aspect, a wind turbine auxiliary drive system is provided that comprises a motor, a drive pinion, a bearing and a lubrication system, the bearing comprising an outer bearing ring, an inner bearing ring and, between these two bearing rings, one or more rows of rolling elements which allow both bearing rings to rotate relative to each other. The inner bearing ring has an inner side comprising a gear which meshes with the drive pinion, wherein a height of the gear in an axial direction is smaller than the height of the inner bearing ring such that a gearless portion is defined, and wherein at least one lubricant inlet and/or at least one lubricant outlet is arranged on said gearless portion.

According to this aspect, the lubrication of the contact areas between raceways and rolling elements arranged inside the bearing is carried out inside the blade root (some components may also be inside the hub) despite having a gear provided on an inner side of the inner bearing ring. This ensures the protection of lubrication components against water, rust and other contaminations without any additional means such as a cover. Also, maintenance of the lubrication system may be relatively simple and cheap as it can be performed from inside the hub.

In some embodiments, at least one lubricant feeder and/or at least one lubricant collector may be directly fixed to the gearless portion. In others, it may be arranged on a reinforcement disc radially fixed to the gearless portion. These types of arrangement substantially avoid relative movement between the at least one lubricant feeder and/or lubricant collector and the bearing.

Further, lubrication components such as feeders and/or collectors, arranged on the reinforcement disc radially fixed to the gearless portion may be mounted above the gear. And a drive motor may be mounted inside the hub and the drive pinion may mesh with the gear below the lubrication components. This way there will be substantially no interference between them when rotating the blade.

In some embodiments, a supporting arrangement for supporting lubrication components may be provided inside the inner bearing ring of the slew bearing in such a way that it traverses a bearing rotational axis. In such cases a pump and/or grease deposit may be arranged on said supporting arrangement. The connections, for power supply and electrical control of the pump and the grease deposit, can be arranged along the bearing rotational axis. This way, these connections will not be substantially affected by the rotational movement of the blade.

In some embodiments, grease circuits for grease or lubricant feeding may be machined in the inner bearing ring in such a way that the at least one lubricant inlet can be directly connected to the one or more rows of rolling elements. This way, the lubricant can reach the contact areas between raceways and internal rolling elements arranged inside them.

Another aspect provides a wind turbine comprising at least one auxiliary drive system substantially as hereinbefore described.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
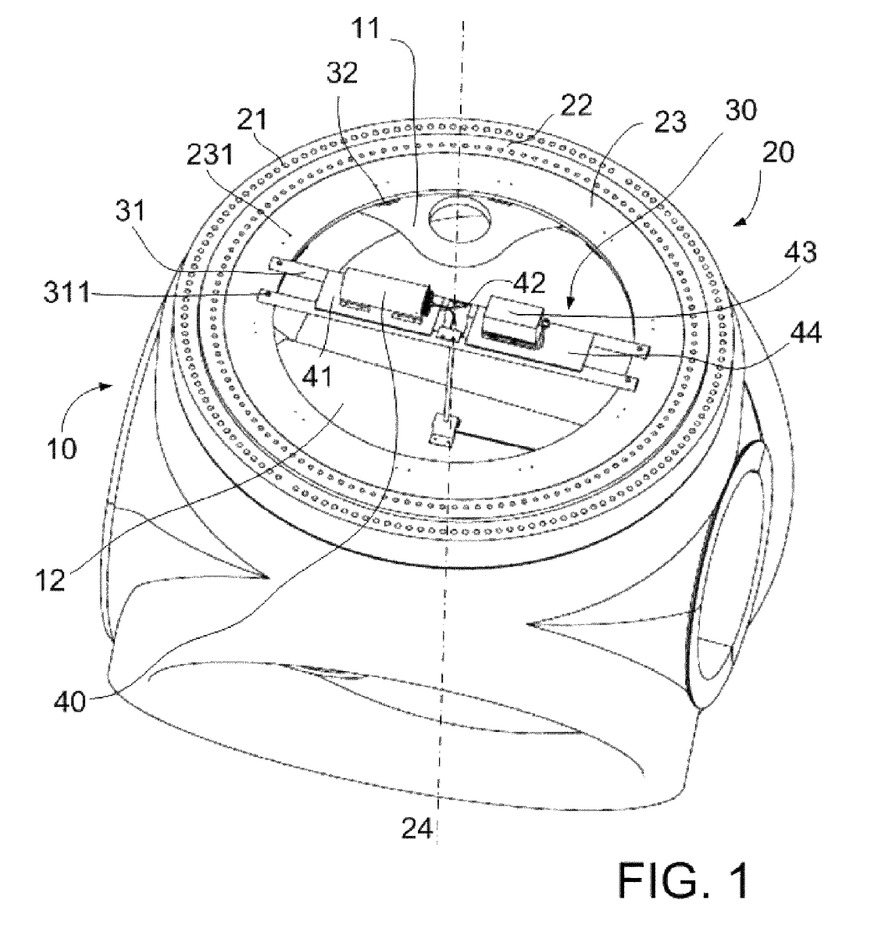
FIG. 1 shows a wind turbine rotor according to an embodiment.
Figure 4:
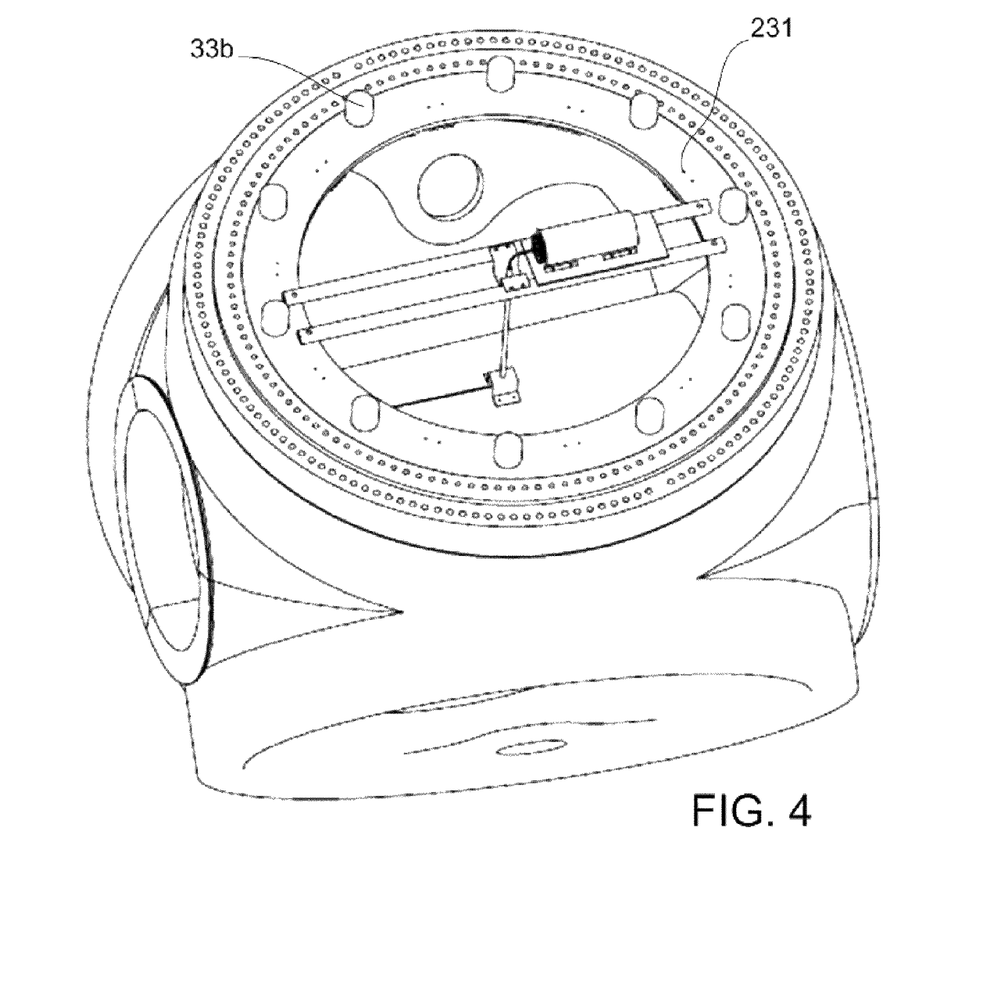
FIG. 4 shows a wind turbine rotor according to another embodiment.

FIGS. 1 and 4 each show a wind turbine rotor according to different embodiments. The same reference numbers will be used for matching parts. The rotor may comprise a hub 10 to which a plurality of blades (not shown) may be rotatably attached. A pitch mechanism may be provided for rotating each blade along its longitudinal axis. The pitch mechanism may comprise a pitch bearing 20. The pitch bearing 20 may comprise an outer bearing ring 21 connected with the hub 10 and an inner bearing ring 22 connected with a blade (not shown). The hub 10 may comprise a flange 11 for mounting a drive pinion of a drive motor (neither shown). In some embodiments, the flange may form an integral piece with the hub. In others it may be a separate piece fixed to the hub by welding or by fastening means such as screws, bolts or similar. Further, a reinforcement ring 23 may be radially fixed to an inner side (reference 222 of FIG. 7a) of the inner bearing ring 22.

The reinforcement ring 23 may be provided with axial through-bores 231. Lubricant injectors 32 may be fixed to the reinforcement ring 23, e.g. using screws, bolts, clamps or any other suitable fastening means in combination with said through-bores 231. Alternatively, the lubricant injectors 32 may be directly fixed to an inner side (reference 222 of FIG. 7a) of the inner bearing ring 22.

Further, a supporting arrangement 30 for supporting lubrication components may be fixed to the reinforcement ring 23 in such a manner that the supporting arrangement 30 traverses a pitch bearing rotational axis 24. The supporting arrangement 30 may comprise two substantially parallel beams 31. Each beam 31 may be fixed to the reinforcement ring 23 by screws, bolts 311 or similar, e.g. one bolt at each end. In alternative embodiments, the supporting arrangement may comprise a beam diametrically fixed to the reinforcement ring. In yet further embodiments, the supporting arrangement may be directly fixed to the inner side of the inner bearing ring.

Such a supporting arrangement 30 may support a lubrication pump 40. In some cases, the pump 40 may be mounted on a platform 41 provided on the beams 31. The pump 40 may be arranged in such a manner that its main connection for power supply 42 may run along the bearing rotational axis 24, from the pump 40 to a front frame 12 on which the hub 10 may be rotatably mounted. And from the front frame, said main connection may continue towards a general electric system housed inside the nacelle (not shown). This way, it may not be affected by a pitch movement of the blade, i.e. the central line will not get tangled up with other components. The pump 40 can be used e.g. to pump lubricant through the lubricant injectors 32 into a feed line through inlets (reference 34 of FIG. 7a) arranged on an inner side (reference 222 of FIG. 7a) of the inner bearing ring 22.

In the embodiment shown in FIG. 1 a lubricant deposit 43 may further be arranged on the supporting arrangement 30. In some cases, the lubricant deposit 43 may be mounted on a platform 44 provided on the beams 31. The lubricant deposit 43 can be used, e.g., to store old lubricant recovered from inside the bearing. Such a lubricant recovery may need a recovery circuit, shown in FIG. 7c and lubricant extractors (reference 33a of FIGS. 2a and 2b). In alternative embodiments, the lubricant deposit may be part of the pump assembly.

Figure 2A:
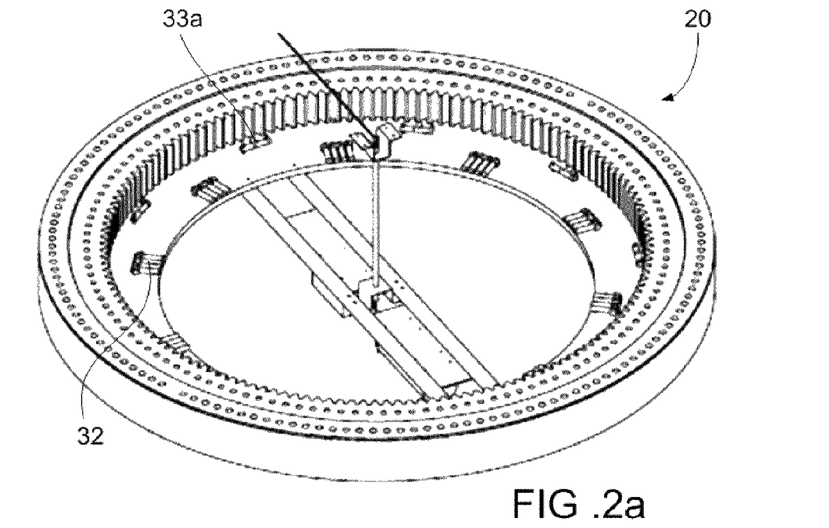
FIGS. 2a-2b show bottom views of FIG. 1.
Figure 2B:
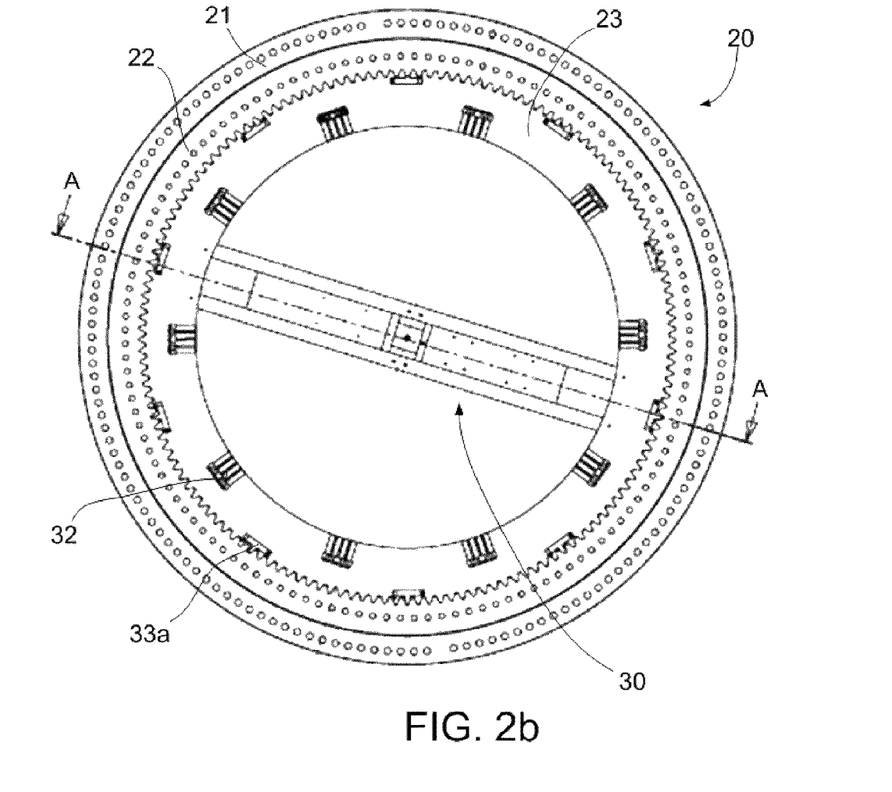

FIG. 2a shows a perspective of FIG. 1 viewed from the bottom, wherein the hub and the flange for mounting the drive pinion have been deleted. FIG. 2b shows a rear view of FIG. 2a. FIGS. 2a and 2b show the lubricant injectors 32 and the lubricant extractors 33a fixed to the reinforcement ring 23. In alternative embodiments, the lubricant extractors 33a may be directly fixed to an inner side (reference 222 of FIG. 7a) of the inner bearing ring 22.

Thus, the components of the lubrication circuit may all be arranged inside the blade root which ensures appropriate protection against corrosion. Furthermore, in case of wind turbines equipped with a temperature and humidity control inside the hub, e.g. for cold climates or desert climates, all the components housed inside the blade root may further be protected from extreme temperatures and humidity. These arrangements may also be suitable for offshore wind farms as no high salt content or humid air can come into contact with these components arranged inside the blade root.

Figure 3:
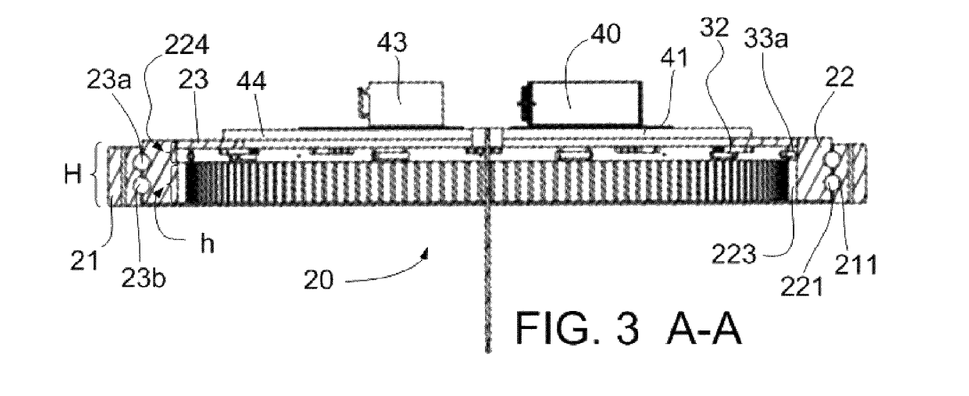
FIG. 3 shows a cross-section along line A-A of FIG. 2b.

FIG. 3 shows a cross-sectional view along line A-A of FIG. 2b. The outer bearing ring 21 and the inner bearing ring 22 may rotate relative to each other by means of two rows 23a, 23b of rolling elements. The rolling elements may be either balls or rollers and the bearing may comprise one or more rows of such rolling elements. The rolling elements may be housed inside a chamber defined by raceways 221 and 211 machined in the inner 22 and outer 21 bearing ring respectively. The inner bearing ring 22 may comprise an annular gear 223 radially on its inside, i.e. on the inner side (reference 222 of FIG. 7a), to mesh with a drive pinion of a drive motor (neither shown) for driving the blade between different pitch positions about its longitudinal axis.

Figure 7A:
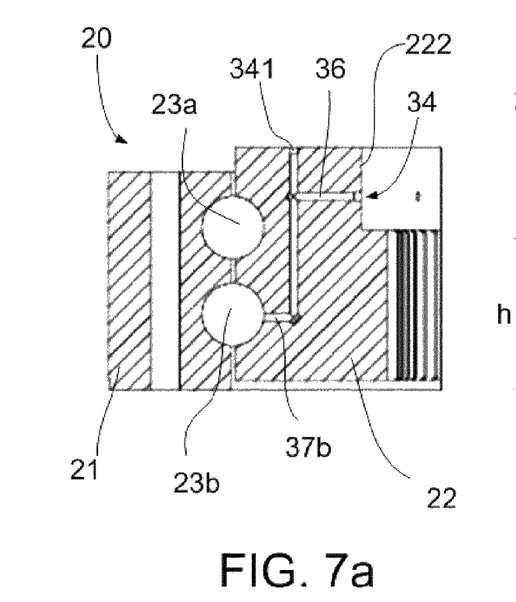
FIGS. 7a, 7b and 7c show a partial cross-section of different embodiments of a slew bearing and its lubricant circuits.
Figure 7B:
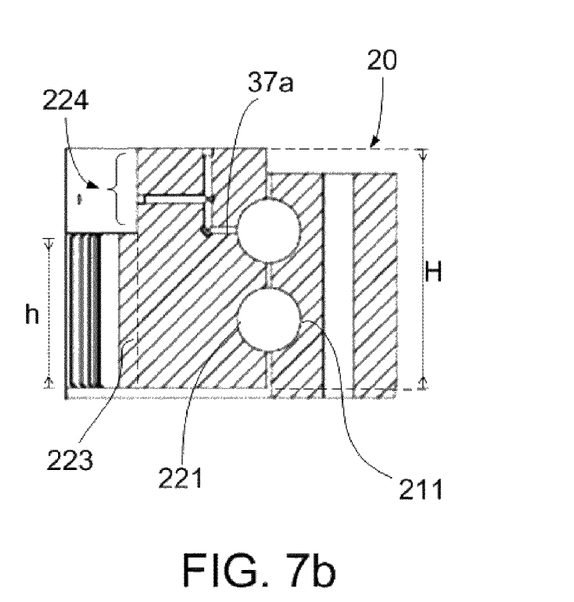

A height h of the gear 223 in an axial direction may be smaller than a height H of the inner bearing ring 22, thus a gearless portion 224 may be defined on the inner side 222 of the inner bearing ring 22 (also shown in FIG. 7b).

In alternative embodiments the gear may be a partial gear or annular gear segments. A gear segment should be understood as a plurality of teeth shaped to be meshed with a drive pinion. Such gear segments or such a partial gear may be axially screwed or bolted to the reinforcement ring. This construction may facilitate the replacement of a deteriorated gear segment.

FIG. 4 shows another embodiment. The main difference with the embodiment shown in FIGS. 1-3 is that the lubricant extractors and lubricant deposit have been replaced by lubricant collectors 33b such as bottles. The use of collectors or bottles is cheaper than the use of extractors, but the manual operation of emptying the bottles may be cumbersome as each bottle has to be emptied separately.

Figure 5:
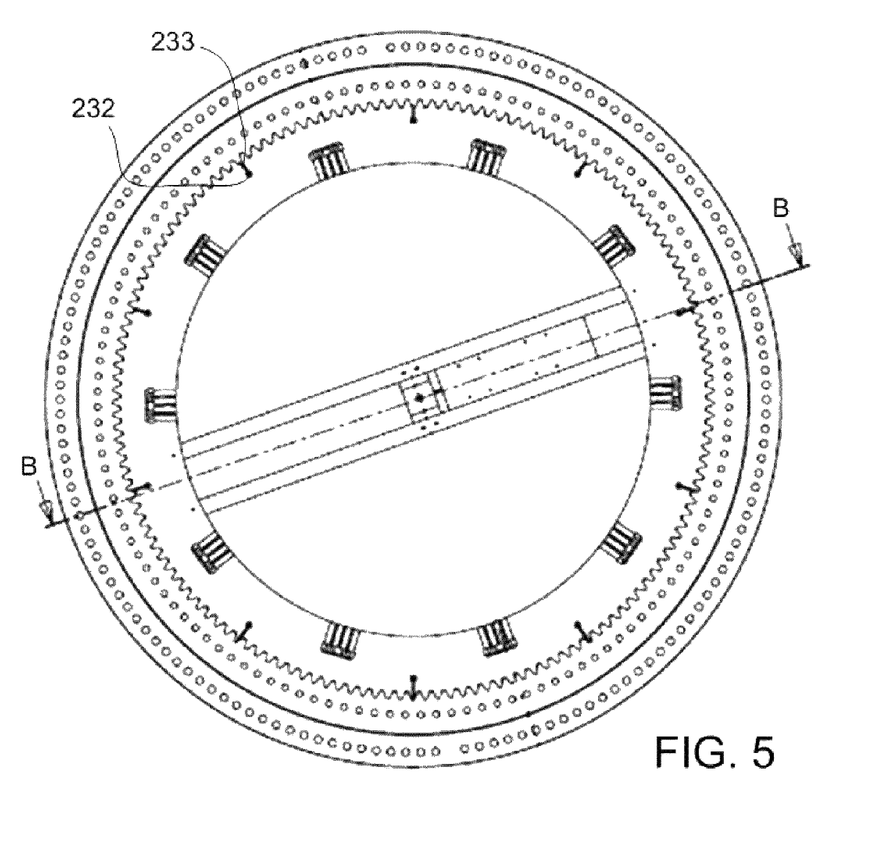
FIG. 5 shows a bottom view of FIG. 4.

FIG. 5 shows a rear view of FIG. 4, wherein the hub and the flange for mounting the drive pinion have been deleted. The reinforcement ring 23 may be provided with a first set of axial through-bores (reference 231 of FIG. 4) and a second set of axial through-bores 232. Lubricant injectors 32 may be screwed to the reinforcement ring 23 by means of the through-bores (reference 231 of FIG. 4) and the lubricant collectors or bottles 33b may be fixed to the reinforcement ring 23 by the through-bores 232. A tube 233 may connect each outlet (reference 35 of FIG. 6) with a lubricant collector or bottle (reference 33b of FIG. 4 or 6).

Figure 6:
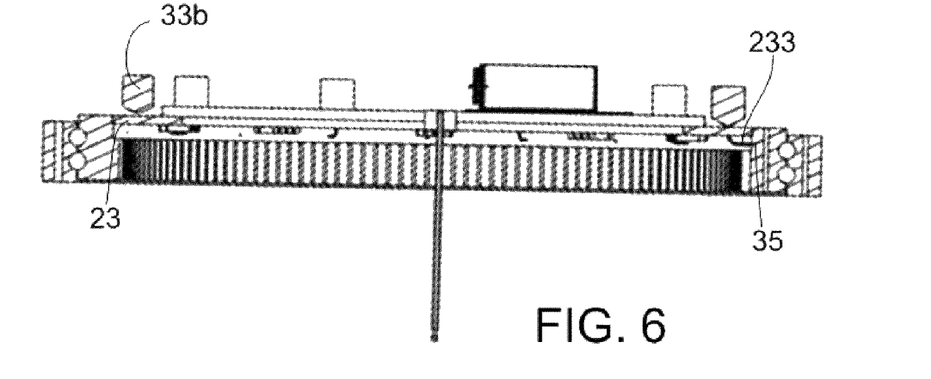
FIG. 6 shows a cross-section along line B-B of FIG. 5.

FIG. 6 shows a cross-sectional view along line B-B of FIG. 5. The main difference with FIG. 3 is that the lubricant extractors and lubricant deposit have been replaced by lubricant collectors 33b such as bottles arranged on the reinforcement ring 23. Each collector 33b may be connected to an outlet 35 of the grease circuit by a tube 233 or similar.

In alternative embodiments, the reinforcement ring may be an annular disc comprising a central opening connecting an inside portion of the blade root with an inside portion of the hub.

Figure 7C:
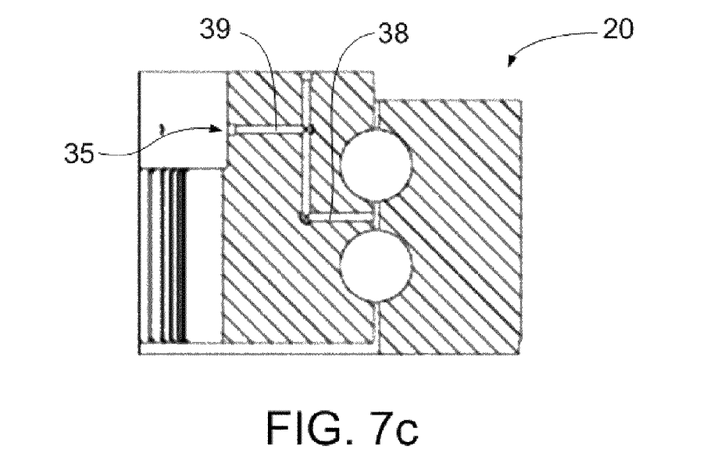

FIGS. 7a, 7b and 7c show cross-sections of the bearing 20 with the lubricant circuits machined therein. The lubricant circuits may define a circulating system that injects and/or drain lubrication fluid into and from the bearing chamber defined by raceways 221, 211 machined in the inner 22 and outer 21 rings respectively. No reinforcement ring is shown in these cross-sections. In these examples, the bearing 20 comprises two rows 23a, 23b of rolling elements. The lubricant circuits may be machined in the inner ring 22 from inlets 34 and outlets 35 arranged on the inner side 222 of the inner ring 22.

The lubricant circuits may be defined by a combination of radial and axial holes. The axial holes may be closed by plugs 341 in order to avoid lubricant escape.

FIGS. 7a and 7b show respective feed circuits, FIG. 7a shows the feed circuit for the lower row 23b of rolling elements and FIG. 7b shows the feed circuit for the upper row 23a of rolling elements in a bearing 20 comprising two rows 23a, 23b of rolling elements. Having a separate feed system for each row of rolling elements ensures a substantially equal distribution of lubricant between rows and avoids loss of charge effects. FIG. 7c shows a recovery circuit arranged between the two rows 23a, 23b of rolling elements.

Injectors 32 may shoot lubricant through inlets 34 arranged on the gearless portion 224 of the inner side 222 of the inner ring 22 to a feed duct 36. From said feed duct 36 the lubricant may be connected to the rows 23a, 23b of rolling elements by a first 37a or a second 37b duct respectively. Some of the inlets 34 may be connected to the first ducts 37a, others may be connected to the second ducts 37b. Alternatively, all inlets 34 may be connected to one passage that selectively supply the different rows 23a, 23b of rolling elements. This way, the inlet 34 can be directly connected to the different rows 23a, 23b of rolling elements thus reaching the contact areas between raceways 221, 211 and internal rolling elements arranged inside them.

FIG. 7c shows a recovery circuit, wherein the old lubricant may be removed by means of a return duct 38 that may be arranged substantially half-way between the two rows 23a, 23b of rolling elements. The return duct 38 may be further connected to a return line 39 that may end on an outlet 35 arranged on the gearless portion 224 of the inner side 222 of the inner ring 22. In some cases the outlets 35 may be connected to collectors (reference 33b of FIG. 4 or 6). In others they may be connected to lubricant extractors (reference 33a of FIG. 2a, 2b or 3) substantially as hereinbefore explained.

Figure 8A:
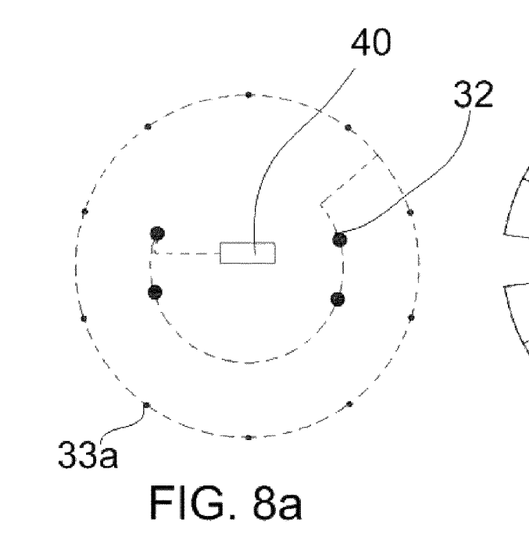
FIGS. 8a-8c show a schematic view of different embodiments of feeding and collecting circuits.
Figure 8B:
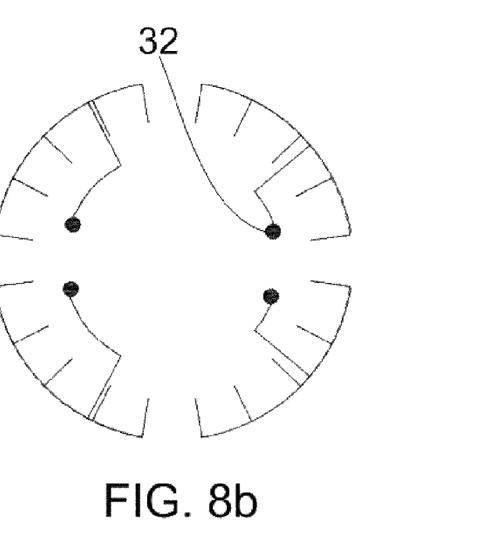
Figure 8C:
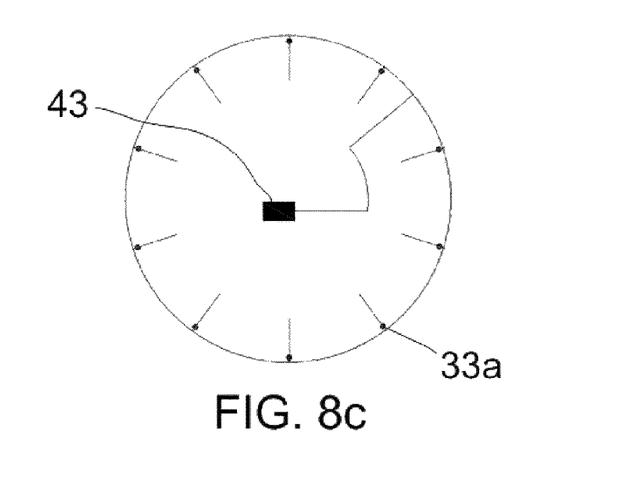

FIGS. 8a and 8b show a grease feeding circuit for a manual or automatic system. FIG. 8c shows a recovery circuit for an automatic system.

In FIG. 8a the grease or lubricant, initially stored in the pump 40, may be pumped to the injectors 32 that may be arranged in series. In case of an automatic system, the clean lubricant of such feeding circuit may also pass through the extractors 33a which may also be arranged in series. Said clean lubricant may provide pressure to activate the extractors 33a.

FIG. 8b shows that the clean lubricant may further be injected inside the raceways by the injectors 32 (already filled with the lubricant originally stored inside the pump). Each injector 32 may feed only one inlet (reference 34 of FIG. 7a).

FIG. 8c shows a recovery circuit for used lubricant that may comprise extractors 33a. The extractors 33a may also be arranged in series. In some embodiments, the used lubricant may be accumulated in a grease deposit 43 substantially as hereinbefore explained.

In the case of a manual system there may not be a recovery circuit as such, but the recovery of used lubricant may be carried out in a passive manner. The used lubricant moves (by pressure) towards the bottles. And, when the bottles are filled they may be manually emptied.

In some cases, the lubricant can be brought to the bearing while the blades are rotating, i.e. when the rolling elements move inside the bearing. This way a better distribution of the lubricant on the raceways is ensured. This alternative is generally preferred in larger wind turbines.

The feeding circuits and the automatic recovery circuit may be controlled by any suitable control means (not shown), which via an enabling switch (not shown) may activate the lubricant injectors or lubricant extractors whenever it is necessary. Also one or more valves (not shown) may be provided in the ducts.

In general, the inlets and outlets are distributed around the circumference. Usually there are more inlets than outlets.

Further, since the injectors and extractors or collectors are fixed, directly or indirectly (by means of a reinforcement ring), these components will not have relative movements with the bearing which reduces the strain of the arrangement.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine auxiliary drive system comprising:
a motor, a drive pinion, a bearing and a lubrication system,
the bearing comprising an outer bearing ring, an inner bearing ring and, between these two bearing rings, one or more rows of rolling elements which allow both bearing rings to rotate relative to each other, the inner bearing ring having an inner side comprising a gear which meshes with the drive pinion,
wherein a height of the gear in an axial direction is smaller than the height of the inner bearing ring such that a gearless portion is defined,
wherein at least one lubricant inlet and/or at least one lubricant outlet is arranged on the gearless portion, and
wherein a supporting arrangement for supporting lubrication components is provided inside the inner bearing ring of the bearing in such a way that it traverses a bearing rotational axis.

2. The wind turbine auxiliary drive system of claim 1, wherein at least one lubricant feeder and/or at least one lubricant collector is directly fixed to the gearless portion.

3. The wind turbine auxiliary drive of claim 1, wherein the supporting arrangement comprises a beam diametrically arranged inside the inner bearing ring.

4. The wind turbine auxiliary drive system of claim 1, wherein the supporting arrangement comprises two substantially parallel beams provided inside the inner bearing ring.

5. The wind turbine auxiliary drive system of claim 1, wherein a grease deposit is arranged on the supporting arrangement.

6. The wind turbine auxiliary drive system of claim 1, wherein grease circuits are machined in the inner bearing ring for grease feeding in such a way that the at least one lubricant inlet is directly connected to the one or more rows of rolling elements.

7. The wind turbine auxiliary drive system of claim 1, wherein the auxiliary drive system is a pitch system.

8. A wind turbine comprising at least one auxiliary drive system according to claim 1.

9. The wind turbine auxiliary drive system of claim 1, wherein at least one lubricant feeder and/or at least one lubricant collector is arranged on a reinforcement disc radially fixed to the gearless portion.

10. The wind turbine auxiliary drive system of claim 9, wherein an outer diameter of the reinforcement disc is slightly bigger than an inner diameter of the inner bearing ring such that the reinforcement disc and the inner bearing ring are shrink-fitted together.

11. The wind turbine auxiliary drive system of claim 1, wherein a pump is arranged on the supporting arrangement.

12. The wind turbine auxiliary drive system according to claim 11, wherein the pump comprises a main connection for a power supply arranged substantially at the bearing rotational axis.

* * * * *